(12) United States Patent  (10) Patent No.: US 7,549,024 B2
Piry et al.  (45) Date of Patent: Jun. 16, 2009

(54) MULTI-PROCESSING SYSTEM WITH COHERENT AND NON-COHERENT MODES

(75) Inventors: Fredric Claude Marie Piry, Cagnes-sur-Mer (FR); Anthony John Goodacre, Cambridge (GB)

(73) Assignee: ARM Limited, Cambridge (GB)

( * ) Notice: Subject to any disclaimer, the term of this patent is extended or adjusted under 35 U.S.C. 154(b) by 352 days.

(21) Appl. No.: 10/880,617

(22) Filed: Jul. 1, 2004

(65) Prior Publication Data
US 2005/0010728 A1 Jan. 13, 2005

(30) Foreign Application Priority Data
Jul. 2, 2003 (GB) ............................ 0315504.1

(51) Int. Cl.
*G06F 12/14* (2006.01)
(52) U.S. Cl. ........................................ 711/141; 711/147
(58) Field of Classification Search .................. 711/141, 711/147
See application file for complete search history.

(56) References Cited

U.S. PATENT DOCUMENTS

| | | | | |
|---|---|---|---|---|
| 5,584,017 | A * | 12/1996 | Pierce et al. ................. | 711/146 |
| 6,330,645 | B1 * | 12/2001 | Harriman ..................... | 711/151 |
| 2002/0007440 | A1 * | 1/2002 | Hosoya et al. ............... | 711/122 |
| 2002/0019921 | A1 * | 2/2002 | Hagersten et al. ........... | 711/205 |
| 2002/0138717 | A1 * | 9/2002 | Joy et al. ..................... | 712/235 |
| 2003/0097539 | A1 * | 5/2003 | Hagersten .................... | 711/203 |
| 2003/0115402 | A1 | 6/2003 | Dahlgren et al. | |
| 2004/0268044 | A1 * | 12/2004 | Heller et al. ................. | 711/118 |
| 2005/0021913 | A1 * | 1/2005 | Heller, Jr. .................... | 711/141 |

FOREIGN PATENT DOCUMENTS

JP 10-97465 4/1998

OTHER PUBLICATIONS

John L. Hennessy and David A. Patterson, Computer Organization and Design, 1998, Morgan Kaufmann Publishers, Inc., second edition, pp. 663-664.*
Silicore Corporation, "VME64 to PCI Bridge System-on-Chip (SoC)" Technical Reference Manual, 2002, pp. 1-129.
Silicore Corporation, Wishbone System-on-Chip (SoC) Interconnection Architecture for Portable IP Cores, Rev. B.2, Oct. 2001, pp. 1-109.
Drawing, "Cycle Concurrency in Wishbond Bus Cyckes" Jul. 2006, 1 page.
Synthesizable VHDL source code file representing the PCIWRAP Entity used in the VME64 to PCI Bridge System-on-Chip (SoC), Jan. 2004, 16 pages.
Synthesizable VHDL source code file representing the VMECORE Entity used in the VME64 to PCI Bridge System-on-Chip (SoC), Jan. 2004, 31 pages.

(Continued)

*Primary Examiner*—Kevin L Ellis
*Assistant Examiner*—Jared I Rutz
(74) *Attorney, Agent, or Firm*—Nixon & Vanderhye P.C.

(57) ABSTRACT

An integrated circuit comprising a plurality of processor cores operable to perform respective data processing operations, at least one of said processor cores being configurable to operate either in a coherent multi-processing mode having access to a coherent region within a memory shared with at least one other processor core or in a non-coherent mode.

5 Claims, 9 Drawing Sheets

OTHER PUBLICATIONS

Synthesizable VHDL source code file representing the SEMABUD Entity used in the VME64 to PCI Bridge System-on-Chip (SoC), Jan. 2004, 5 pages.

Synthesizable VHDL source code file representing the SEMABUF Entity used in the VME64 to PCI Bridge System-on-Chip (SoC), Jan. 2004, 6 pages.

Synthesizable VHDL source code file representing the SEMAREG Entity used in the VME64 to PCI Bridge System-on-Chip (SoC), Jan. 2004, 4 pages.

* cited by examiner

MULTI-PROCESSING SYSTEM WITH COHERENT AND NON-COHERENT MODES

BACKGROUND OF THE INVENTION

1. Field of the Invention

The present invention relates to the field of data processing and more particularly to the field of coherent multi-processing systems in which two or more processor cores share access to a coherent memory region.

2. Description of the Prior Art

In the field of data processing, integrated circuits are known that comprise several processor cores. These processor cores are either coherent multi-processing mode processor cores that have access to a coherent memory region shared with other processor cores, or they are non-coherent processing mode processor cores. A coherent memory region is one that will always provide the latest value written to a particular address to a read operation to that address, and that ensures that any write values are correctly written to the memory.

Coherent multi-processing cores can have individual and private copies of the memory at a particular time, in order to increase efficiency. However, in order to ensure that the memory accessed remains coherent at all times i.e. that any memory access to a particular address will always find the latest value, coherency managing operations need to be performed within these systems. It is known to provide coherent multi-processing systems in which two or more processor cores share access to a coherent memory region. Such systems are typically used to gain higher performance, the different processor cores executing respective data processing operations in parallel. Known data processing systems which provide such coherent multi-processing capabilities include IBM370 systems and SPARC multi-processing systems.

An important aspect of such coherent multi-processing systems is the need to co-ordinate the activity of the different processor cores and in particular manage the manner in which they keep the memory which they share in a coherent state. As an example, if one of the processor cores has read a data value from memory and is currently updating that data value prior to writing it back to memory, then an intervening action by another processor core seeking to read that same data value from the coherent shared memory needs to be provided with the updated data value even though this has not yet been written back to the main memory and is only present in one of the other processor cores. This type of situation requires coherency management and is one example of the type of coherent multi-processing management operations which need to be provided in such systems.

Thus, there are both advantages and drawbacks to coherent multi-processing processor cores and it depends on the functions to be performed whether it is more efficient to use coherent multi-processing processor cores or non-coherent processing cores. A processor core operating in non-coherent mode never requires coherency managing operations to be performed in response to any memory access that it makes.

SUMMARY OF THE INVENTION

A first aspect of the present invention provides an integrated circuit comprising: a plurality of processor cores operable to perform respective data processing operations, at least one of said processor cores being configurable to operate either in a coherent multi-processing mode having access to a coherent region; within a memory shared with at least one other processor core or in a non-coherent mode.

The present invention recognises that a non-coherent processor core may be particularly suited for performing some functions, while other functions may be performed more efficiently using coherent multi-processing. Given the expense of designing new integrated circuits it may not be appropriate to design and build a new integrated circuit having the most suitable processor cores for each particular circumstance. The present invention addresses this problem by providing an integrated circuit with at least one processor core that is configurable to operate either in a coherent multi-processing mode having access to a coherent memory region shared with at least one other core or in a non-coherent processing mode. This means that an extremely flexible integrated circuit is produced that can be efficiently used for a variety of applications, with the number of cores operating as coherent multi-processing mode processors and non-coherent processors able to be changed depending on the tasks to be performed. A coherent multi-processing mode processor core is one that has access to a coherent memory region shared with other processor cores, while a non-coherent processing mode processor cores is one that never requires coherency to be maintained in response to a memory access that it performs.

In preferred embodiments, the integrated circuit further comprises: at least one write enabled control parameter storage element operable to store at least one mode control parameter related to said at least one configurable processor core, said mode control parameter controlling whether said processor core is currently operable in a coherent multi-processing mode or in a non-coherent processing mode.

An effective way of configuring the processor is to use a mode control parameter to control the mode of operation, so that the mode of operation can be selected simply by writing to the storage element containing the mode control parameter.

In some embodiments, the integrated circuit further comprises: a memory access control unit operable to control access to said memory by said plurality of processor cores; wherein said memory access control unit is operable to perform coherency management operations on at least some memory access requests received from said processor cores operating in a coherent multi-processing mode and to direct memory access requests received from said processor cores operating in a non-coherent processing mode to said memory without performing coherency management operations.

In this embodiment the ability to function in either non-coherent processing mode or coherent multi-processing mode is achieved by providing a memory access control unit that can perform coherency management operations on at least some memory access requests when a core is operating in a coherent multi-processing mode while simply directing memory requests to the memory when the core is operating in a non-coherent processing mode.

In most embodiments, said at least some memory access requests comprise memory access requests that require coherency management operations to be performed to ensure said shared memory regions remains coherent.

When operating in multi-processing mode, not all memory access requests are liable to produce coherency errors. In preferred embodiments the memory access control unit only performs coherency management operations on those that are liable to produce coherency errors, thereby saving processing time.

In preferred embodiments, said at least one configurable processor core is operable in response to said control parameter indicating said processor to be currently operating in a multi-processing mode to augment said at least some memory access requests with additional information, said memory access control unit being operable to perform coherency management operations in response to receipt of said additional information.

By augmenting the memory access request with additional information in response to the mode control parameter indicating the processor to be operating in multi-processing mode, the processor core is able not only to communicate to the memory control unit that coherency managing operations are required but also to provide it with additional information possibly related to the type of operations needed.

Advantageously, said integrated circuit further comprises at least one data bus for passing said memory access requests from said at least one configurable processor to said memory control unit, said at least one data bus comprising a main portion and a multi-processing portion, said at least one configurable processor core being operable to transmit said memory access requests via said main portion of said bus and said additional information via said multi-processing portion.

By having a data bus with two portions, in non-coherent processing mode where no coherency operations are required, the main portion of the bus can be used for transmitting memory access requests. If, however, coherency managing operations are required the additional data to signal this to the memory control unit can be added to a further portion of the bus, the so called multi-processing portion. Dividing the bus into two portions like this means that the basic memory access signal is sent along a separate portion of the bus and can be accessed on its own. This makes the system "backwards compatible" with other processing systems that do not perform coherent management operations using a memory control unit. It also means that there is a portion of the bus that peripherals that operate in a non-coherent processing mode can connect to and read any memory access requests without the need for modification.

In some embodiments, said at least one configurable processor core is operable to deactivate said multi-processing portion of said bus in response to said mode control parameter indicating said at least one configurable processor core to be currently operable in said non-coherent processing mode.

This is a particularly effective way of configuring the system to operate in non-coherent processing mode as in this mode the core communicates with peripherals via a standard bus sized to send memory access requests and thus peripherals are unaware that the core can also operate in a coherent multi-processing mode.

Preferably, said at least one configurable processor core is operable to de-activate said multi-processing portion of said bus when transmitting memory access requests that do not require coherency managing operations to be performed to ensure said shared memory region remains coherent.

When coherency operations are not required then the configurable processor core can deactivate the multi-processing portion of the bus and thereby ensure that the memory control unit does not perform a coherency management operation that is not required, thereby improving the efficiency of the circuit.

Preferably, said at least one configurable processor core comprises a memory region associated with it, said memory access control unit being operable to deny other processor cores access to said associated memory region in response to said mode control parameter indicating said at least one configurable processor core to be currently operable in said non-coherent processing mode.

Preferably said at least one configurable processor core comprises a memory area associated with it, said memory area being able to mirror said shared memory region, said memory access control unit being operable not to check said associated memory area when servicing a memory access request and when said control parameter indicates said at least one configurable processor core to be currently operable in said non-coherent processing mode.

The mode control parameter can also be used to control the memory access control unit to deny said coherency management operations access to its associated memory region, generally its cache. This is because the cache of a processor core operating in non-coherent processing mode do not mirror said shared memory regions, and thus, it would be a waste of time to check the cache in response to memory access requests from other processor cores. It is therefore efficient to use the mode control parameter to inhibit such an access.

In some embodiments, one of said processor cores is operable to write to said at least one control parameter storage element, while in others the integrated circuit comprises an input port in data communication with said control parameter storage element, such that said mode control parameter can be controlled by an external signal.

By allowing the control parameter storage element to be written to by one of the cores, software can be written that configures the processor core to be operable in non-coherent processing or in coherent multi-processing mode according to a desired application. Alternatively, the system can be configured in response to an external signal input to a pin on the integrated circuit.

In some embodiments, the control parameter storage element for a particular processor core is located within the core itself, generally in the CP15 register. In other embodiments the control parameter storage element is stored elsewhere in the integrated circuit, possibly in the memory control unit itself. The storage element may be a multi-bit storage element which is relevant to several processor cores or it may be a single bit for just one processor core.

A further aspect of the present invention provides a method of processing data comprising performing data processing operations upon respective ones of a plurality of processor cores formed on an integrated circuit, at least one of said processor cores being configurable to operate either in a coherent multi-processing mode having access to a coherent region within a memory shared with at least one other processor core or in a non-coherent processing mode not having access to a coherent shared memory region.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
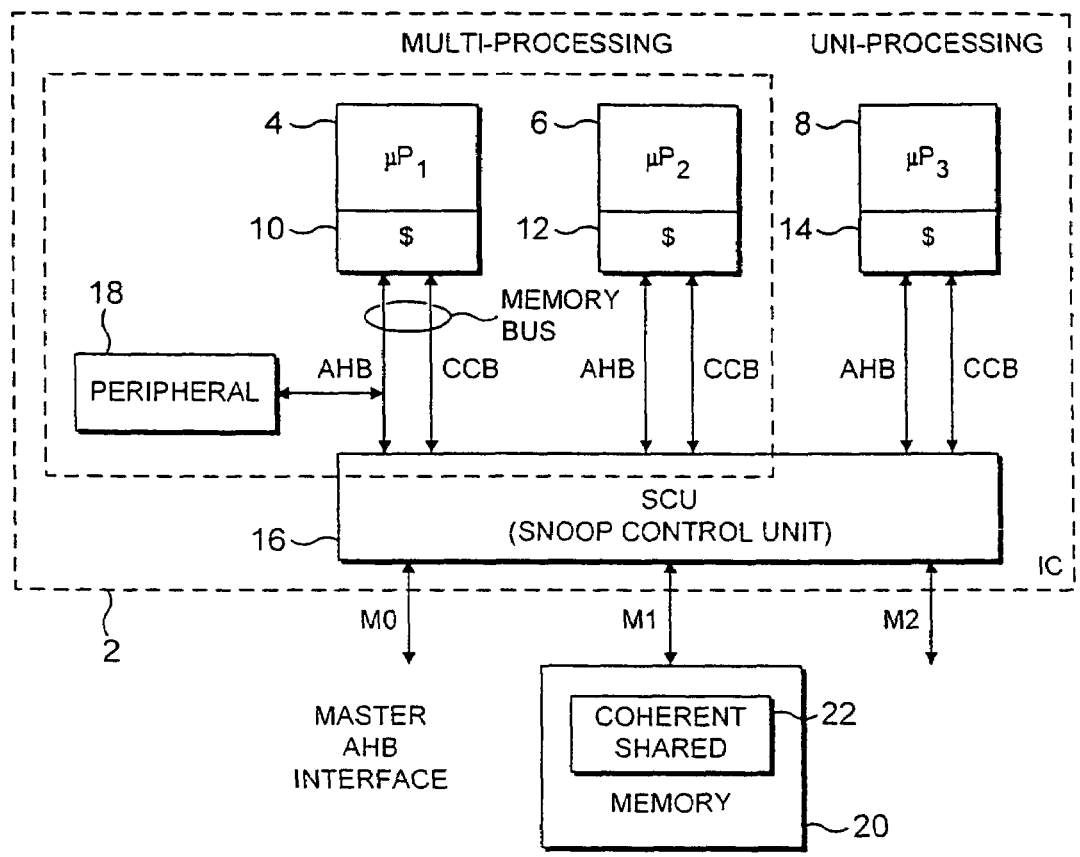
FIG. 1 schematically illustrates a data processing system including a plurality of processor cores.

FIG. 1 schematically illustrates an integrated circuit 2 containing a plurality of microprocessor cores 4, 6, 8, each with an associated cache memory 10, 12, 14. The processor cores 4, 6, 8 are connected by respective memory buses AHB, CCB to a memory management access unit 16 (also called a snoop control unit). A peripheral device 18 is provided as a private peripheral connected to one of the processor cores 4.

The integrated circuit 2 is coupled to a memory 20 by one of several possible master AHB ports. The memory 20 contains a coherent shared region 22. Memory may be configured and used as non-coherent shared memory when more than one processor has access to it, e.g. a general purpose processor core and a specialist DSP core may share access to a common memory region with no control of coherency being performed. Coherent shared memory is distinguished from non-coherent shared memory in that in coherent shared memory the mechanisms by which that memory is accessed and managed are such as to ensure that a write or a read to a memory location within that coherent shared region will act upon or return the current and most up-to-date version of the data value concerned. Thus, coherent shared memory is such that if one processor core makes a change to a data value within the coherent shared region, then another processor core will read that up-to-date data value when it seeks to access that data value. Furthermore, a write to a data value within the coherent memory region 22 will force a change in other stored copies of that data value, at least to the level of ensuring that out-of-date copies are marked as invalid and so subsequently not used inappropriately.

In the system of FIG. 1, the snoop control unit 16 is responsible for managing access to the memory 20, and the coherent shared memory region 22 in particular. The snoop control unit 16 keeps track of which processor cores 4, 6 that are acting in a coherent multi-processing mode are currently holding local copies of a data value from the coherent memory region 22 within their cache memories 10, 12. Coherency management is in itself a known technique. Descriptions of such techniques may be found for example within the Western Research Laboratory Research Report 95/7 entitled "Share Memory Consistency Models: A Tutorial" by Sarita V. Adve and Kourosh Gharachorloo; University of Wisconsin—Madison Computer Sciences Technical Report/902 December 1989; "Week Ordering—A New Definition And Some Indications" by Sarita V. Adve and Mark D Hill; and "An Implementation Of Multi Processor Linux" by Alan Cox, 1995. Whilst coherent multi-processing itself is an established technique, the provision of such capability with reduced hardware complexity overhead, backward compatibility and configuration flexibility is a significant challenge.

Figure 2:
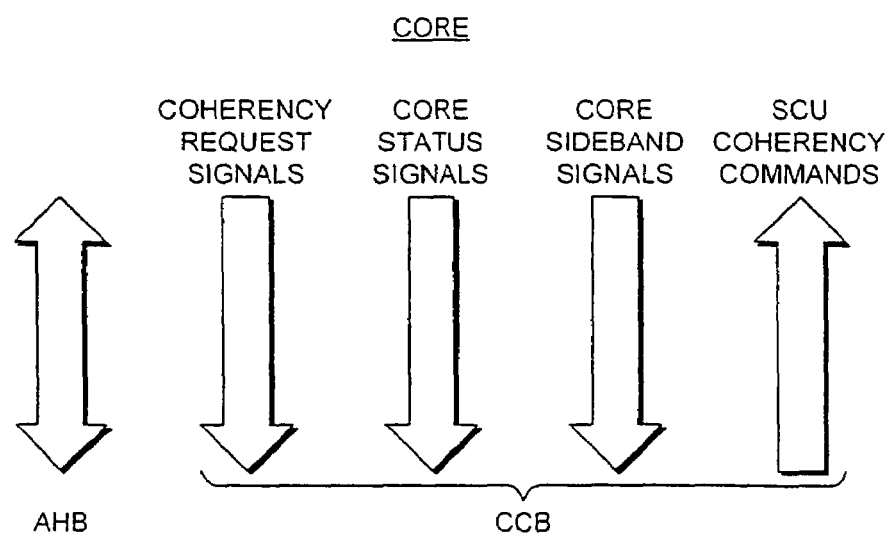
FIG. 2 schematically illustrates a memory bus between a processor core and a memory access control unit.

FIG. 2 illustrates the memory bus between the processor cores 4, 6, 8 and the snoop control unit 16 in more detail. In particular, this memory bus is formed of an AHB bus (AMBA High-Performance Bus) in parallel with a coherency control bus (CCB). The AHB bus has the standard form as is known from and described in documentation produced by ARM Limited of Cambridge, England. This AHB bus is a uni-processing bus with the normal capabilities of operating with processor cores performing uni-processing (or non-coherent multi-processing such as a core and a DSP accessing a shared non-coherent memory). The AHB bus does not provide capabilities for coherent multi-processing. Private peripheral devices, such as a peripheral device 18 as illustrated in FIG. 1, may be connected to this bus without modification providing they do not need to access the coherent multi-processing capabilities of the system. This provides advantageous backward compatibility with existing peripheral designs.

The coherency control bus CCB can be considered to provide a number of respective channels of communication between the attached processor core 4, 6 and the snoop control unit 16. In particular, the core may generate coherency request signals, core status signals and core side band signals which are passed from the processor core 4, 6 to the snoop control unit 16. The snoop control unit 16 can generate coherency commands that are passed from the snoop control unit 16 to the respective processor core 4, 6.

The CCB in particular is used to augment signal values on the AHB to provide additional information from the core 4, 6 to the snoop control unit 16 characterising the nature of a memory access being requested such that the coherency implications associated with that memory access request can be handled by the snoop control unit 16. As an example, line fill read requests for the cache memory 10, 12 associated with a coherent multi-processing core 4, 6 may be augmented to indicate whether they are a simple line fill request or a line fill and invalidate request whereby the snoop control unit 16 should invalidate other copies of the data value concerned which are held elsewhere. In a similar way, different types of write request may be distinguished between by the coherency request signals on the CCB in a manner which can then be acted upon by the snoop control unit 16.

The core status signals pass coherency related information from the core to the snoop control unit such as, for example, signals indicating whether or not a particular core is operating in a coherent multi-processing mode, is ready to receive a coherency command from the snoop control unit 16, and does or does not have a data value which is being requested from it by the snoop control unit 16. The core sideband signals passed from the core to the snoop control unit 16 via the CCB include signals indicating that the data being sent by the core is current valid data and can be sampled, that the data being sent is "dirty" and needs to be written back to its main stored location, and elsewhere as appropriate, that the data concerned is within an eviction write buffer and is no longer present within the cache memory of the core concerned, and other signals as may be required. The snoop control unit coherency commands passed from the snoop control unit 16 to the processor core 4, 6 include command specifying operations relating to coherency management which are required to be performed by the processor core 4, 6 under instruction of the snoop control unit 16. As an example, a forced change in the status value associated with a data value being held within a cache memory 10, 12 of a processor core 4, 6 may be instructed such as to change that status from modified or exclusive status to invalid or shared in accordance with the applied coherency protocol. Other commands may instruct the processor core 4, 6 to provide a copy of a current data value to the snoop control unit 16 such that this may be forwarded to another processor core to service a memory read request, from that processor core. Other commands include, for example, a clean command.

Figure 3:
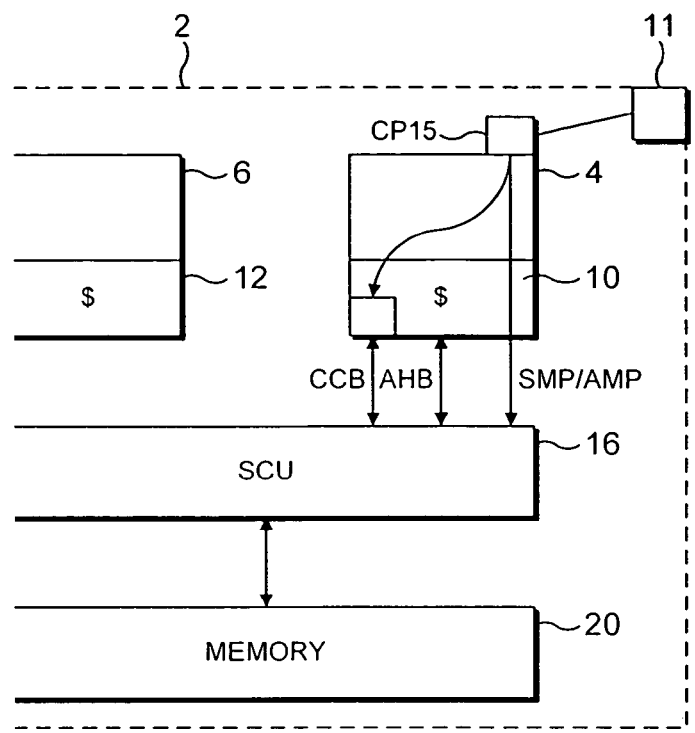
FIG. 3 schematically illustrates a portion of an integrated circuit showing a processor core having a mode control parameter stored in the CP15 register.

FIG. 3 illustrates a section of an integrated circuit 2 according to an embodiment of the invention. The integrated circuit 2, comprises a memory access control unit 16, (often referred to as the snoop control unit or memory management access unit), a memory 20 and a plurality of processor cores 4, 6. The processor cores include processor core 4 that is configurable to operate either in non-coherent processing mode or in coherent multi-processing mode. The other processor cores (not all shown in FIG. 3) may be multi-processor cores, non-coherent processor cores or they may be like processor core 4 configurable to operate as either.

Processor cores operating in coherent multi-processing mode have access to a shared memory region, this region being cachable by the cores operating in coherent multi-processing mode and a defined portion of memory 20. Processor cores operating in non-coherent mode do not access coherent shared memory region and their caches do not mirror any data contained in these regions.

Although memory 20 is shown as a block on the integrated circuit 2, this is purely for ease of illustration and in reality memory 20 may include a variety of data stores on and/or off the integrated circuit and also the caches of the processor cores.

Processor core 4 has an associated cache memory 10 and a mode control parameter storage element, which in this embodiment is part of the CP15 register. The mode control parameter controls the processor core to operate either in non-coherent processing mode or in coherent multi-processing mode. The parameter may be set in a variety of ways including in response to a software command from an application or operating system, or it may be hardware controlled by a signal on an external pin 11.

As in the other embodiments processor core 4 communicates with the snoop control unit via a bus. This bus is divided into two portions, the main or AHB portion and the multi-processing or CCB (coherency control bus) portion. The main portion is used to transmit memory access signals from the processor core to the snoop control unit and from the snoop control unit to the core, the additional portion is used for additional information related to coherency management operations.

In operation when the mode control parameter is set to indicate that the processor core is to operate in non-coherent processing mode, the core acts in response to this signal to de-activate the CCB. This means that memory access signals are sent by the AHB bus alone and have no additional coherency related data attached to them. As no additional coherency information is received by the snoop control unit 16 it performs no coherency operations on the memory access request but simply directs the memory access request to the relevant portion of memory 20.

As can be seen from FIG. 3, in addition to controlling the core 4 to de-activate the CCB, the mode control parameter is sent directly to the snoop control unit 16 as an SMP/AMP signal. As in this case the mode control parameter is set to indicate that the processor core 4 is operating in non-coherent processing mode, the signal received by the snoop control unit 16 indicates that the cache 10 of processor core 4 is not mirroring any shared memory. Cache memory 10 is therefore not relevant to the snoop control unit 16 when it is servicing memory access requests from other cores and the snoop control unit 16 therefore ignores cache memory 10 when servicing memory access requests from other processor cores.

When the mode control parameter is set to indicate that processor core 4 is to operate in coherent multi-processing mode, the CCB bus is not automatically de-activated. In this circumstance the core may produce additional information to describe a particular memory access request and act to transmit the memory access request on the AHB bus and the additional data on the CCB bus. The receipt of the additional information on the CCB bus indicates to the snoop control unit that processor core 4 is operating in coherent multi-processing mode and that coherency management operations need to be performed. In some circumstances the memory access request is such that although the core is operating in coherent multi-processing mode it knows that there are no coherency problems associated with this particular request. In these circumstances, for example, where the core knows that the latest version of the data it needs to read is in its own cache, the core acts to de-activate the CCB as in the non-coherent processor mode and no additional information is sent with the memory access request. In this case as in the non-coherent processing mode example the snoop control unit knows that no coherency management operations need to be performed and thus it simply directs the memory access request to the memory location indicated.

As in this case the mode control parameter is set to indicate coherent multi-processing mode, the cache 10 of processor core 4 mirrors part of the shared memory accessible to other processor cores 6 operating in coherent multi-processing mode and is thus relevant to the snoop control unit 16 servicing memory access requests from coherent multi-processing mode processors. As the snoop control unit 16 receives a signal giving the value of the mode control parameter it is aware of this and as such does not ignore the cache 10 of core 4 when servicing memory access requests from other processor cores operating in coherent multi-processing mode.

Figure 4:
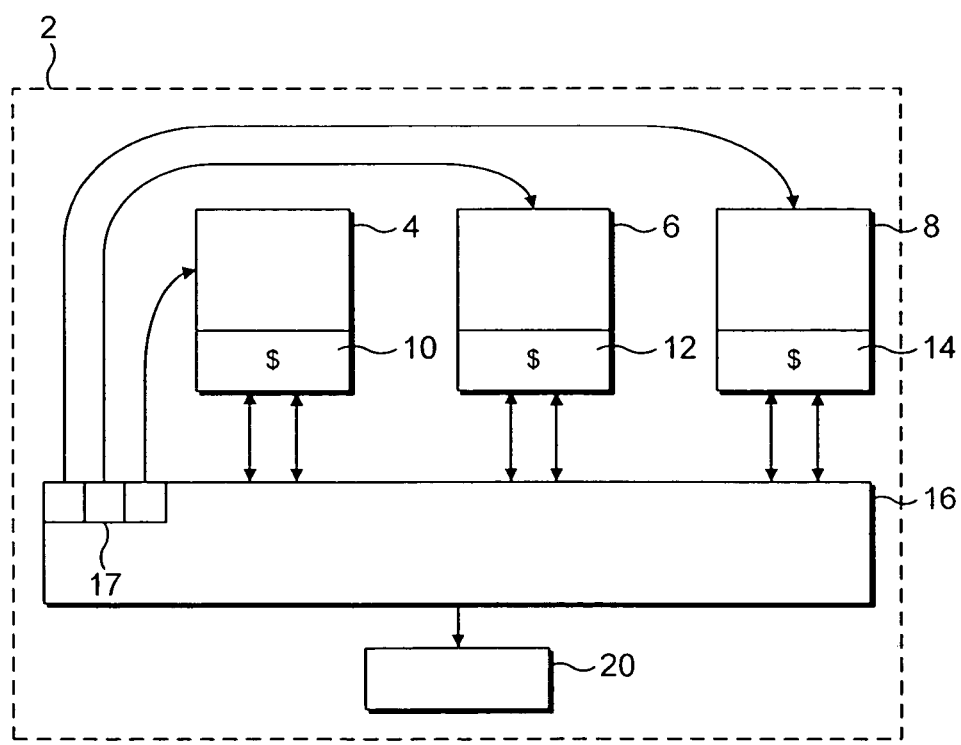
FIG. 4 schematically illustrates an integrated circuit having a mode control parameter stored in the memory control unit.

FIG. 4 shows an alternative embodiment where the processor cores 4, 6, 8 are all configurable to operate either in multi-processing or in non-coherent processing mode. In this embodiment the mode control parameters are not stored on the processor cores themselves but are rather stored on the snoop control unit 16. In the embodiment shown these signals are sent to the cores and can be used by the cores, as in the embodiment illustrated in FIG. 3, to disable the CCB if they indicate the processor core to be operating in non-coherent processor mode. As they are stored on the snoop control unit 16, the snoop control unit has access to them and uses them to determine which processor core caches it needs to access when servicing memory access requests from coherent multi-processing mode processor cores.

Although the two embodiments illustrated have shown the control parameters stored either in the configurable core 4 or on the snoop control unit 16, it would be possible to store these parameters elsewhere on the integrated circuit 2. In all of these embodiments the control parameters may be set in a variety of ways including in response to a software command from an application or operating system, or they may be hardware controlled by a signal on an external pin (not shown).

Figure 5:
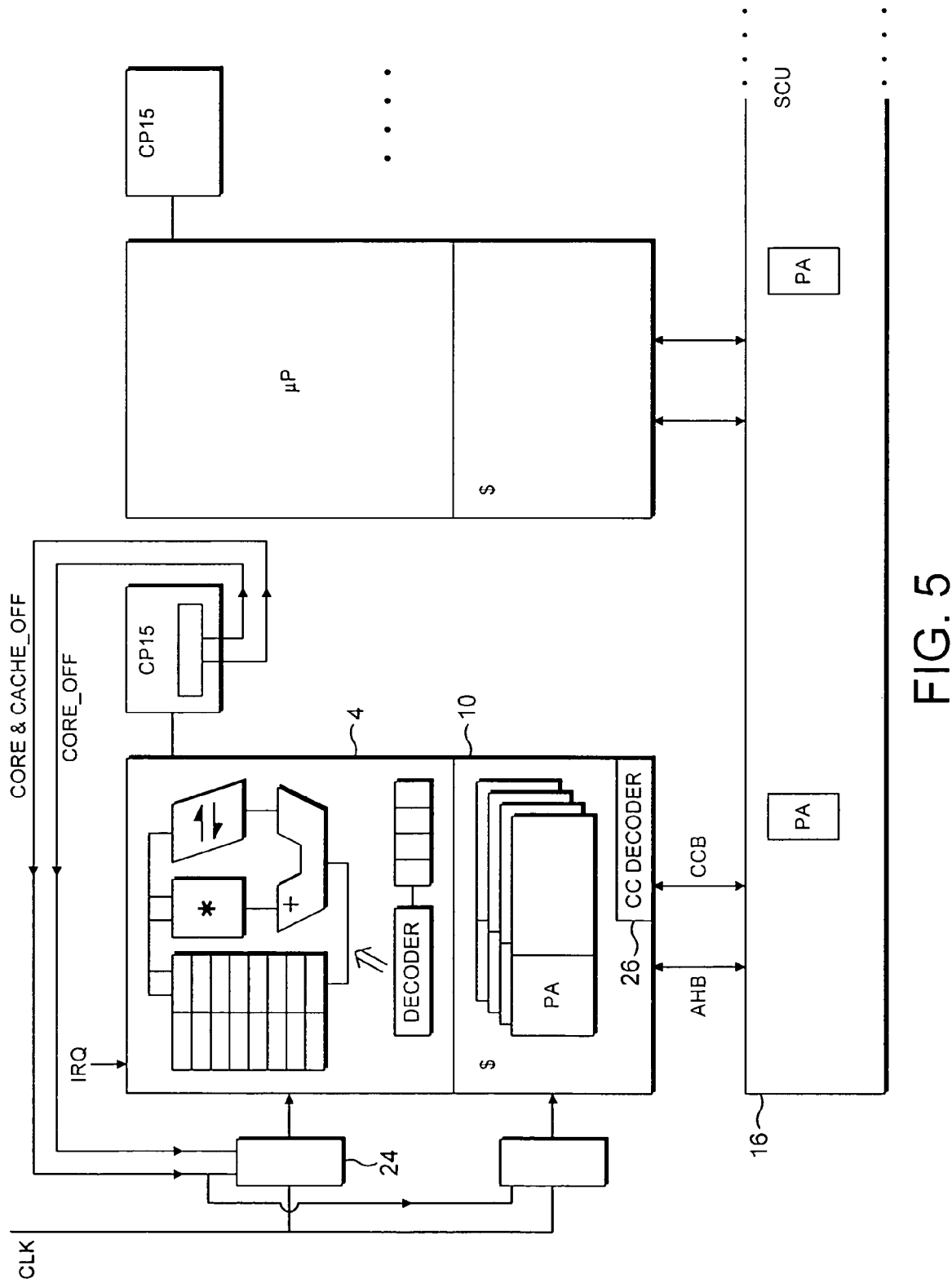
FIG. 5 illustrates a processor core and a cache memory which are separately clocked such that the processor core may be powered down whilst the cache memory remains responsive to coherency management operations.

FIG. 5 schematically illustrates a processor core 4 with an attached cache memory 10. This cache memory 10 is a 4-way physically addressed cache memory. The cache memory 10 is supplied with its own clock signal. The clock signal which is supplied to the processor 4 may be gated off by a control gate 24 whilst the clock continues to be supplied to the cache memory 10. Thus, the processor core 4 may be stopped and placed into a power saving mode by gating off its clock with the control gate 24. A status flag within a core configuration coprocessor CP15 is used to switch the control gate 24 between allowing the clock signal to pass and gating off the clock signal. One type of WFI (wait for interrupt) instruction is used to trigger setting of this status flag and gating of the core clock while the cache clock remains active. Another type of WFI instruction may be used to gate the clock to both the core and the cache.

Within the cache memory 10, a coherency command decoder 26 is provided and is responsive to coherency commands passed via the CCB from the snoop control unit 16. These coherency commands include forcing a change in status associated with a data value held within the cache memory 10, returning a copy of a data value held or cleaning a data value held as instructed by the snoop control unit 16. Thus, whilst the processor core 4 may be placed into a power saving mode to reduce overall system power consumption, the cache memory 10 can remain responsive to coherency management requests issued by the snoop control unit 16 and directed to it via the CCB. This enables significant power saving whilst not compromising the coherency management.

A further description of the multi-processor architecture in general is given in the following:

Terms and Abbreviations

This document uses the following terms and abbreviations.

| Term | Meaning |
|---|---|
| SMP | Symmetric Multi-Processing |
| AMP | Asymmetric Multi-Processing |
| L2CC | Level Two Cache Controller |
| WFI | Wait For Interrupt. Low power mode. All clocks in the core are switched off, the core being awaken on the receipt of an interrupt. |

Introduction

We describe hereafter a global Multi-processing platform. The specified architecture should allow both SMP and AMP within the same platform, with the same programmer's model.

A typical MP system includes:
Memory coherency support;
Interrupt distribution mechanism;
Inter-processor communication channels;
Multi-core debug capabilities;
Multi-core trace capabilities.

This architecture enables the development of Low Power Multi-processing systems (the WFI state for Low Power mode is supported).

This architecture should scale to cores having a private Level 2 cache.

Ease of integration of this architecture into already existent designs has been considered. The current specification should allow replacing a single core with an SMP-capable system with no other change in the design.

SMP Solution

Coherent Multiprocessing Memory System

The chosen solution is shown in FIG. 1:

Two main tasks were identified to produce a multi-processing memory system:

Add MP extensions to the ARM core to produce a Multi-processor-capable core. These modifications include moving the core to physical addressing, updating the cache line states, and adding a Coherency Control Bus (CCB) at core interface;

Produce a block responsible for the memory system coherency, dubbed the Snoop Controller Unit (SCU). This block implements the MESI coherency protocol at the system level and sends coherency requests to cores in the memory system.

SMP-Capable Cores

Standard ARM cores should be modified to take advantage of the Multi-Processing environment:

They can and receive messages to/from the Snoop Control Unit (SCU) through the Coherency Control Bus (CCB);

They handle SMP information in their cache lines, like basic MESI states, SMP/AMP awareness and migratory-lines detection;

They may provide new MP instructions, to support a better locking mechanism.

However, an important point is that an SMP capable core will still be compatible with the standard AHB bus, and can work seamlessly in a non-Multiprocessing memory environment.

The Snoop Controller Unit

In the ARM MP-architecture, a centralized unit (dubbed the SCU, for Snoop Control Unit) controls AHB requests coming from the cores and checks them for coherency needs. This unit ensures that memory consistency is maintained between all caches. When necessary it sends control messages to data caches (INVALIDATE, CLEAN or COPY commands) and redirects memory transfers (directly between processors, or to the external AHB interface).

Different features can be added to the SCU. These features are mostly transparent to the programmer, and can improve performance and/or power consumption. These may be configurable, and can be arranged to ensure that their default configuration does not change the programmer's model. Although this is not mandatory, the SCU can for example maintain a local copy of all processors DATA TAG arrays to speed-up coherency lookups without having to ask (and therefore stall) processors in the memory system.

The SCU also uses an external master AHB interface. This interface can send writes requests to memory, and read data from the main memory if the requested line is not present in other Data caches (snoop miss). In order to ease the implementation of a SMP-capable system, this external interface is designed to plug easily to a L2CC, an AMBA3 wrapper or a standard AHB bus.

Coherent Protocol and Busses

Snooping Activity and Coherency Protocol

At the SCU level, each memory request coming from an SMP core generates a coherency check. Only data-side caches of processors in the SMP memory system are looked up for the required data.

The cache coherency protocol used for the Core-SCU communication is based on the MESI protocol. However, it has been modified using a Berkeley approach to improve its performance and power consumption.

In a Multiprocessing memory system, the *consistency model* is an important piece of the Programmer's model. It defines how the programmer should expect the memory content to change while issuing reads and writes. The consistency model of the ARM MP architecture is the Weak Ordering model, which ensures correct program behaviour using synchronisation operations.

Coherency Control Bus

A bus between the core and the SCU, dubbed the Coherency Control Bus (CCB), is responsible for passing messages between the SCU and the cores. This defines a standard interface between a SMP capable core and the SCU.

As the SMP architecture evolves this allows the SMP-core interface to remain stable.

This bus is also providing status signals mandatory to implement Multiprocessing features, as described in the *Supported Features* section given below.

Supported Features

SMP/AMP Attribute

In a multiprocessor system, one could imagine dedicating one or more processor(s) to non-SMP tasks/OS. This means that this (these) processor(s) will never handle shared data.

This can be the case if someone wants to avoid porting applications from one OS to a new one. The solution is to run a separate OS on a dedicated processor, even if this OS is not SMP capable. This can also be considered for specific tasks/threads that do not need any OS support, like for example when running a dedicated multimedia task on a separate processor (which may have a specific or private coprocessor).

Processing coherency checks on each AHB request from these processors is useless, since they will never share data, and it penalises the performances of both the whole system (since you will add load to the SCU) and the processor itself (since you introduce latency on the AHB request for looking for coherency needs).

An attribute in CP15 defines whether the processor is working in symmetrical mode or not. It defines if AHB requests from the processor should be taken into account by the SCU and whether this processor's Data cache has to be looked at upon coherency requests from other processors.

This attribute is sent to the SCU as a SCSMPnAMP bit.

Direct Data Intervention

Description

When a processor requires a line which is stored in another processor's cache, the SCU can transmit the line from the processor having it to the one requesting it.

The goal is to limit accesses to the following memory level, those accesses penalising both timing and power consumption. The SCU will hence get the line from the owner, and will forward it to the requiring processor.

Different line status changes are defined, depending on the state of the line in the owning processor (Modified, Shared or Exclusive), the type of request (read or write) and whether the migratory line feature is enabled or not.

Coherency with Core OFF and Caches ON

An additional Wait-for-Interrupt instruction has been defined that allows turning off the core while maintaining coherency in the L1 caches (caches ON).

MP-capable cores thus have two Wait-for-interrupt instructions:
  A WFI instruction that puts both the core and the caches in a low-power state.
  A WFI instruction that puts the core in a low-power state while the caches are still ON and able to service coherency requests from the SCU (FORCE/COPY and CLEAN operations)

Both WFI instructions are implemented as CP15 instructions.

The way the low-power state is achieved is through clock-gating. A module at the CPU level stops the clock of the core or the clock of both the core and the cache.

The core escapes the low-power WFI state upon reception of an interrupt.

The Coherency Control Bus (CCB)

The Coherency Control Bus (CCB) is responsible for passing coherency messages between an ARM MP-capable core and the Snoop Controller Unit (SCU).

This bus is originally designed for a multi-processing system based on the ARM1026 core family. The AMBA bus used between the ARM1026 core and the SCU is a private one.

However, the defined CCB specification is also applicable to the following memory environments:
  AHB-lite memory systems (using multiple private slaves at the core level);
  Full AHB memory systems (featuring multiple masters at the core level);
  AXI memory systems (AHB 3.0) with minor modifications.

The bullet specification of this Coherent Control Bus (CCB) is:
  Sideband signals are added to the AMBA bus at the master interface, on control and data paths;
  Coherent AMBA requests (requests with the SCREQ sideband signal asserted) must be dispatched to the Snoop Control Unit;
  The Snoop Controller Unit uses a private channel to send coherency commands to the core;
  Requested coherent data and core notification messages are sent to the SCU as AMBA write accesses;

In the following chapter, we present the CCB scheme with more details in an AHB 2.0 memory environment.

CCB Overview

Sideband Signals On Core Requests

When sending a memory request on the AMBA bus, a Multi-Processing aware core sets the "CCB core sideband" signals to indicate what type of memory burst is needed.

The value of this sideband bus distinguishes between the following operations:
  standard Read and Write AMBA requests;
  coherent "Line Fill" and "Line Fill and Invalidate" read requests;
  coherent "Write Through and Invalidate", "Write Not Allocate and Invalidate" and "Invalidate" write requests;
  "CP15 Invalidate" and "CP15 Invalidate All" notifications
  requested "CLEAN/COPY data transfers";

A precise list of signals with their encoding is available below.

SCU Coherency Command Channel

While ensuring the memory system consistency, the SCU may have to send coherency commands to all cores in the memory system.

The following coherency operations are defined:
  change the state of a cache line (FORCE command);
  change the state of a cache line and CLEAN the line contents on the bus;
  change the state of a cache line and COPY the line contents on the bus;
  do nothing (NOP command).

Together with the coherency operation, a MESI state is sent. It indicates the final state of the cache line once the coherency operation has been processed.

The Snoop Controller Unit uses a private communication channel to send coherency commands to the core:
  the SCOP bus indicates to the core which coherency operation is needed;
  the SCCOREREADY signal indicates to the SCU if the current coherency request has completed, and if the core is ready to process another request (in a similar way to the AHB HREADY signal).

This bus does not depend on the AMBA bus. If a coherency request is required by the SCU while the SCCOREREADY signal is asserted, the core has to register the coherency request and drop the SCCOREREADY signal.

The SCCOREREADY signal should remain LOW as long as the core has not completed the coherency operation.

Please refer to timing diagrams and description below for more information regarding coherency requests management.

Sending CP15 Notifications

When a core issues a "CP15 INVALIDATE" or "CP15 INVALIDATE ALL" command on its data cache, it has to send a message to the SCU unit. This message is needed to force the SCU to update its Dual Tag arrays.

This "CP15 notification" message is sent by the core as a single AHB WRITE cycle as follows (see timing diagrams):
  SCREQ=HIGH, indicating a coherent request addressed to the SCU block;
  SCINV=LOW and SCDATA=LOW, indicating a "CP15 INVALIDATION" notification message;
  The WDATA bus value is not relevant for this message. At the SCU level, this request is considered as "CP15 notification", and thus will not be forwarded to main memory;
  The HADDR bus value is not relevant for this memory access. Instead this bus contains the Index+Way address for the invalidation operation.
  This means that the AMBA address decoding logic (if any) sitting between the core and the SCU should always select the SCU slave port when receiving a memory request which has the SCREQ bit asserted.

Processing Coherency Requests at the Core Level

When the core receives a coherency command coming from the SCU on the SCOP bus, it registers the requested operation and is getting prepared to service the request.
  Many cases may appear at the core interface:
  a) If the core is not processing any memory transfer at the BIU interface, it can start the coherency request immediately (FORCE/CLEAN/COPY).
    If cleaned/copied data must be sent back to the SCU, the core produces an incrementing AMBA WRITE burst as follows (see timing diagrams below):
      SCREQ=HIGH, indicating a coherent request addressed to the SCU block;
      SCINV=LOW and SCDATA=HIGH, indicating a "COPY/CLEAN transfer"
      The SCDATAVALID and SCDIRTYWR are updated on a data basis;
      As for CP15 notification messages, the HADDR sent value is not relevant for this message.
      At the SCU level, this message is considered as a "COPY/CLEAN transfer" and will not be forwarded to main memory.
  b) If the core is processing/requesting a non-coherent data (SCREQ signal is not asserted), it can complete his current burst as usual. This is the case when the core is processing either a memory transfer to a private slave or a non-coherent memory transfer to the SCU.
    Once the burst has completed, the core must then process the "CLEAN or COPY data transfer" as explained in case a/.
  c) If the core is processing/requesting a memory request (SCREQ signal is asserted), this means that the core is currently issuing a coherent memory transfer with the SCU.
    In this case, the transfer cannot complete until the core has serviced the coherency command sent by the SCU. The reason for this behaviour is that it may hide a deadlock case for the memory system.
    It is guaranteed that the SCU will not process the stalled request further (by asserting HREADY to HIGH or sending data back) until the coherency command has been serviced. The core must start processing the coherency request (FORCE/CLEAN/COPY).
    If cleaned/copied data must be sent back to the SCU, the core can send it to the SCU on the WDATA bus while setting SCDATAVALID and SCDIRTYWR signals on a data basis (see timing diagrams below).

CCB Signals

The Coherency Control Bus (CCB) can be divided in 4 signal groups:
  Core coherency request signals: these signals are controlled by the core and are sent in parallel with the AMBA request. They indicate if the AMBA request is a coherent one, and tell the SCU what kind of coherency action is required.
  The following coherent memory requests are defined:
    LF [Line fill]: issued when a read miss happens in a processor. This command requests a line in either shared or exclusive state. The final state will depend on the SCU's answer.
    LFI [Line Fill and Invalidate]: issued when a write miss happens in a processor, if Write Allocation is enabled. This command requests exclusive ownership of a line.
    WTI [Write Through Invalidate]: issued when the cache is configured in Write Through mode. In this case, the SCU must invalidate the corresponding line in other processors if needed. In the case where the processor has already the line either in Exclusive or Modified state, the command will not be issued.
    WNAI [Write non-allocate invalidate]: Issued when the cache is configured in write non-allocate mode, and the line isn't in the cache. The SCU must then invalidate the line in other processors if needed.
    Invalidate: issued on a Write Hit to the cache, with the line being in shared state. We do not need to send data on the bus. Upon reception of this message, the SCU invalidates lines in other caches.
    CP15 invalidations: those messages are used to update the DUAL TAG ARRAYS located in the SCU.
  Core status signals: these signals are coherency status signals sent by the core. They indicate if the core is ready to process coherency commands coming from the SCU, and they give the status of the current coherency request.
  Core sideband signals: these signals are sent by the Core in parallel with the data during a coherency operation.
  SCU command signals: these signals are used by the SCU to send coherency commands to the core.

| Core coherency request signals (in parallel with AHB request) | | | |
|---|---|---|---|
| Name | Width | Output | Description |
| SCREQ | 1 bit | Core | Indicates that the AMBA request must be checked for coherency. It remains stable for the duration of the request. SCREQ must always be equal to zero if SCSMPnAMP is clear or if the request is not addressed to the SCU.<br>SCREQ = 1'b0: normal AHB reads and writes - no coherency check is performed.<br>SCREQ = 1'b1: the current request is a coherent request/message addressed to the SCU. |
| SCINV | 1 bit | Core | Together with the type of the AHB transaction and SCREQ, distinguishes between:<br>LF (0) and LFI (1) requests;<br>CP15 operations or coherent COPY/CLEAN DATA TRANSFERS (0) and WTI/WNAI or INVALIDATION (1) requests;<br>This signal is stable during a memory request. |

-continued

Core coherency request signals (in parallel with AHB request)

| Name | Width | Output | Description |
|---|---|---|---|
| SCWT | 1 bit | Core | Together with the type of the AHB transaction and SCREQ, distinguishes between:<br>    WNAI (0) and WTI (1) requests.<br>This signal is stable during a memory request. |
| SCALL | 1 bit | Core | Together with the type of the AHB transaction and SCREQ, distinguishes between:<br>    CP15 INVALIDATE (0) and CP15 INVALIDATE ALL (1) requests.<br>This signal is stable during a memory request. |
| SCDATA | 1 bit | Core | Together with the type of the AHB transaction and SCREQ, distinguishes between:<br>    INVALIDATE (0) and WTI/WNAI (1) requests<br>    CP15 INVALIDATE/CP15 INVALIDATE ALL operations (0) and coherent COPY/CLEAN DATA TRANSFERS (1) |
| SCWAY | 4 bits | Core | Indicates which cache way is used by the core for the current Line Fill request. It is also used with the "CP15 INVALIDATE ALL" message to indicate which ways are to be cleaned.<br>This signal is encoded using 1 bit per cache way. |

Core status signals

| Name | Width | Output | Description |
|---|---|---|---|
| SCSMPnAMP | 1 bit | Core | Indicates whether or not the processor is part of the SMP system, i.e. if this processor's Data cache has to be looked at upon coherency requests from other processors. When clear, the processor is totally isolated from the MP cluster and is not part of the snooping process. The Dual Tag array information is not maintained for this processor.<br>The SCSMPnAMP value can be changed at the core level through a CP15 operation. It must remain stable when a memory request is being processed. |
| SCCOREREADY | 1 bit | Core | Indicates that the core is ready to receive a coherency request from the SCU (See timing diagrams below). |
| SCnPRESENT | 1 bit | Core | Not Present bit: indicates that the line requested by the SCU is no longer present in the core's cache. |

Core status signals

| Name | Width | Output | Description |
|---|---|---|---|
| | | | This signal is valid in the cycle when SCCOREADY indicates the completion of the request (See timing diagrams below). |

Core sideband signals

| Name | Width | Output | Description |
|---|---|---|---|
| SCDATAVALID | 1 bit | Core | Indicates that the data sent by the core is valid and can be sampled (See timing diagrams below). |
| SCDIRTYWR | 1 bit | Core | Dirty attribute sent along with the data for COPY and CLEAN coherency operations (See timing diagrams below). |
| SCEWBUPDATE | 1 bit | Core | Indicates that a data line has been placed in the Eviction Write Buffer in core and is not present in the data RAM. Valid on cache Line Fills, and in the first cycle of a "CP15 INVALIDATE" message (See timing diagrams below). |

SCU command signals

| Name | Width | Output | Description |
|---|---|---|---|
| SCOP | 2 bits | SCU | Coherency operation sent by the SCU to the core:<br>    "00": NOP<br>    "01": FORCE cache line state value<br>    "10": COPY<br>    "11": CLEAN |
| SCUMIG | 1 bit | SCU | Indicates that the incoming cache line is migratory so that the Cache State Machine can react accordingly (optional signal). |
| SCADDR | 32 bits | SCU | Snooping Address bus<br>This bus is used to send coherency requests to a core. It can hold a Physical Address, an Index/Way value, or a direct link to the core's Eviction Write Buffer. |
| SCSTATE | 2 bits | SCU | Indicates the final cache line state after a coherency operation or a "Line Fill"/"Line Fill Invalidate" request (See timing diagrams):<br>    "00": Invalid<br>    "01": Shared<br>    "10": Exclusive<br>    "11": Modified |

| SCREQ | HWRITE | SCINV | SCDATA | SCWT | SCALL | Coherency message |
|---|---|---|---|---|---|---|
| 0 | — | — | — | — | — | Standard memory request |
| 1 | 0 | 0 | — | — | — | Line Fill request |
| 1 | 0 | 1 | — | — | — | Line Fill and Invalidate request |
| 1 | 1 | 0 | 0 | — | 0 | CP15 INVALIDATE request |
| 1 | 1 | 0 | 0 | — | 1 | CP15 INVALIDATE ALL request |
| 1 | 1 | 0 | 1 | — | — | coherent CLEAN/ COPY transfer |
| 1 | 1 | 1 | 0 | — | — | INVALIDATE request |
| 1 | 1 | 1 | 1 | 0 | — | WNAI request |
| 1 | 1 | 1 | 1 | 1 | — | WTI request |

Coherency messages encoding (Core to SCU)

AHB2.0 Timing Diagrams

The following timing diagrams explain the core/SCU communication:

Line Fill example;

Invalidate All example;

FORCE command example (Not Present case);

COPY command example (hit case);

CLEAN command example (miss case);

Coherent write burst delayed by a COPY command.

Figure 6:
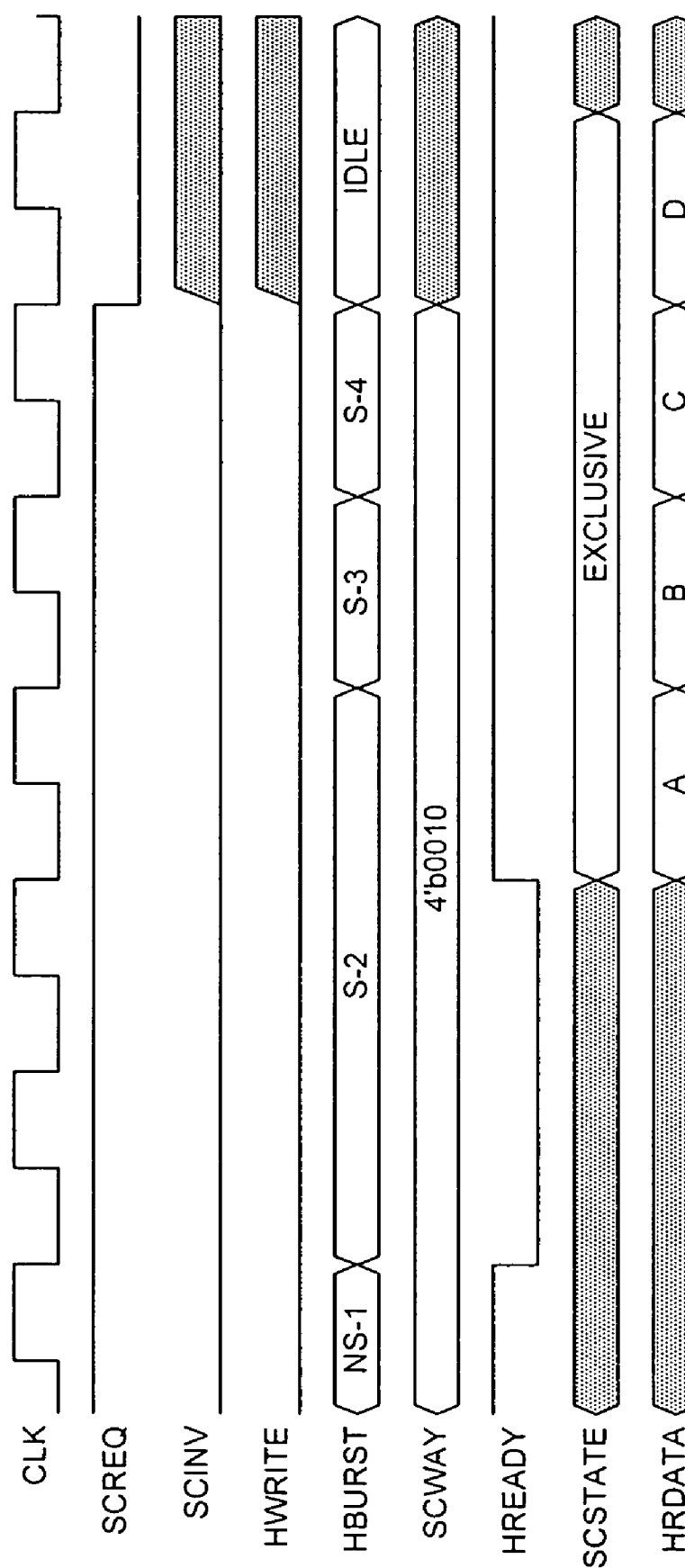
FIGS. 6 to 11 illustrate further details of a multi-processor architecture and bus interface in accordance with example embodiments of the present techniques.

Coherent Line Fill Request (See FIG. 6)

Figure 7:
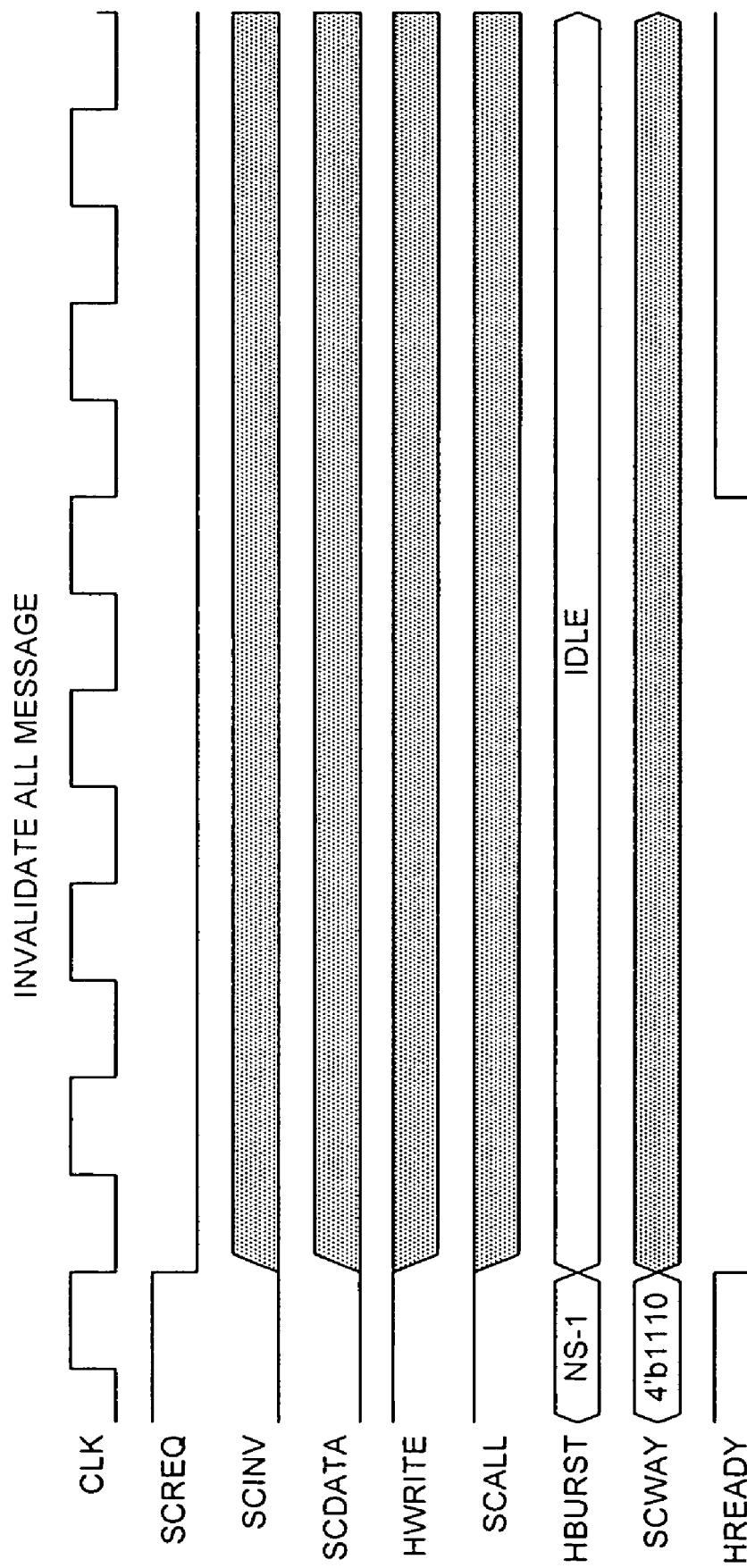

INVALIDATE ALL Message (See FIG. 7)

FORCE Command (Not Present Case)

Figure 8:
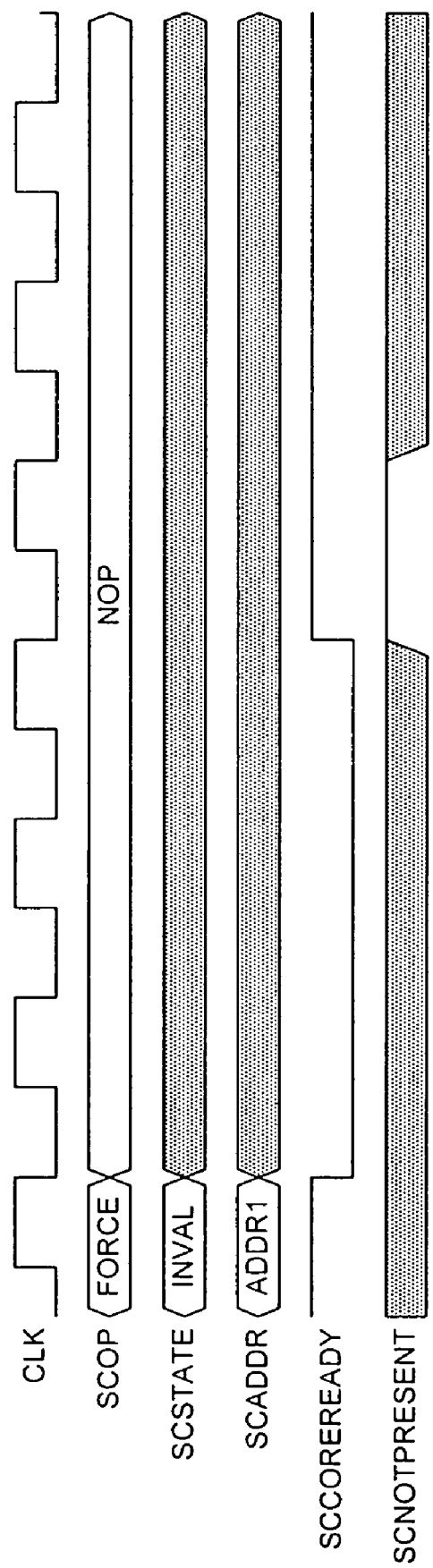

(See FIG. 8)

COPY Command (Hit Case)

Figure 9:
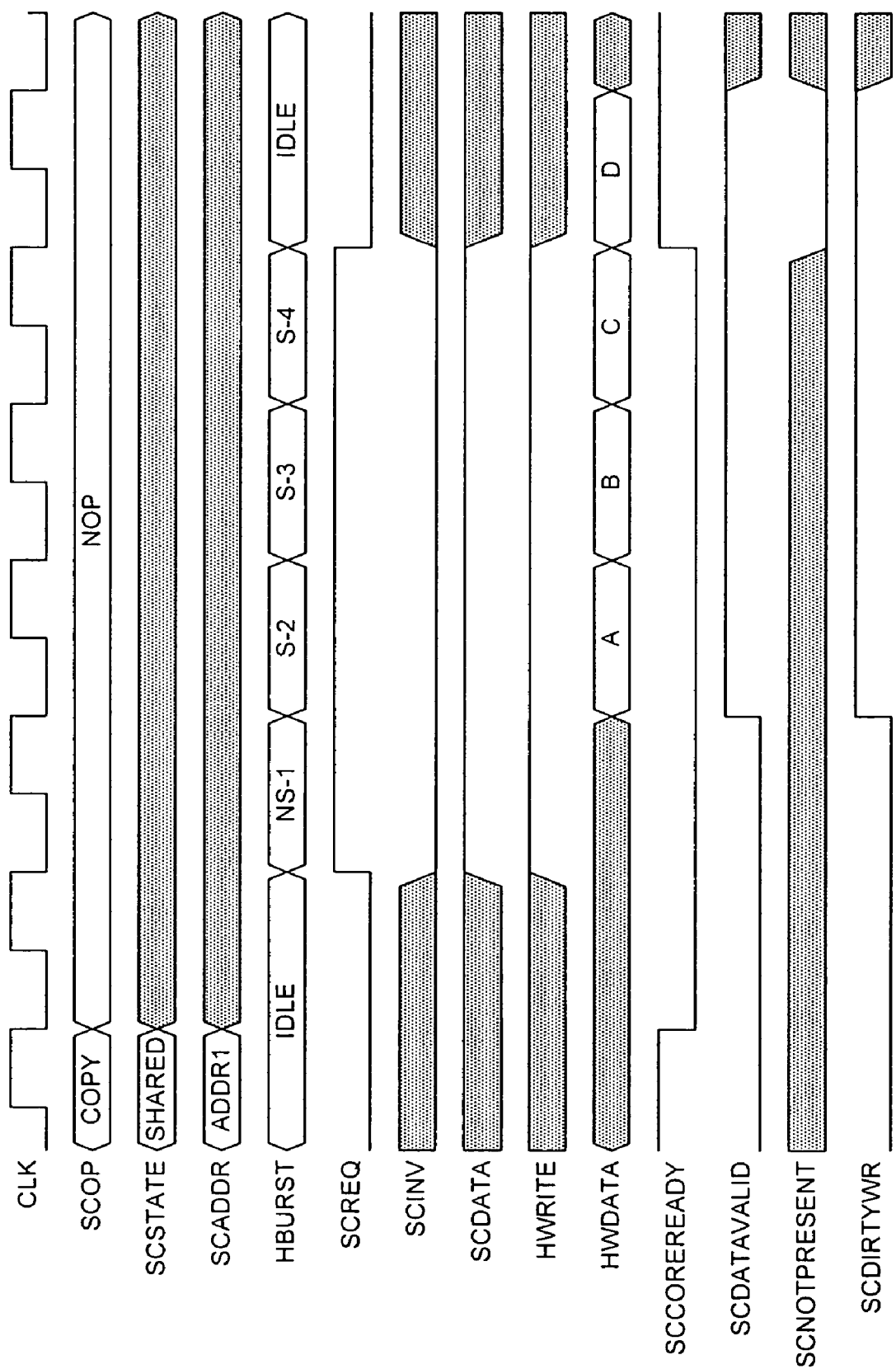

(See FIG. 9)

CLEAN Command (Miss Case)

Figure 10:
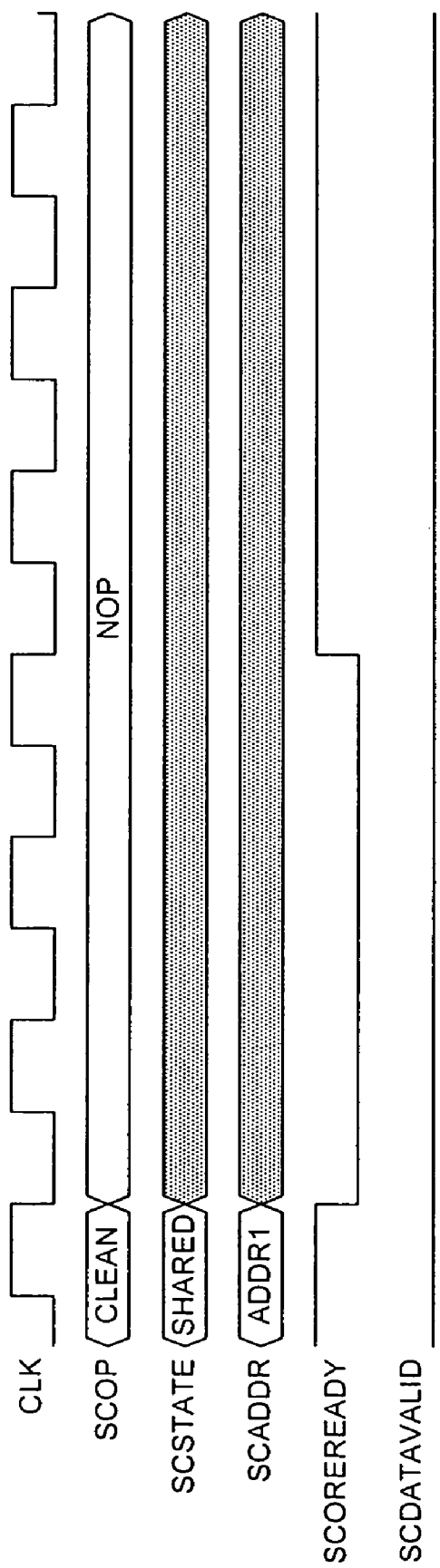

(See FIG. 10)

Figure 11:
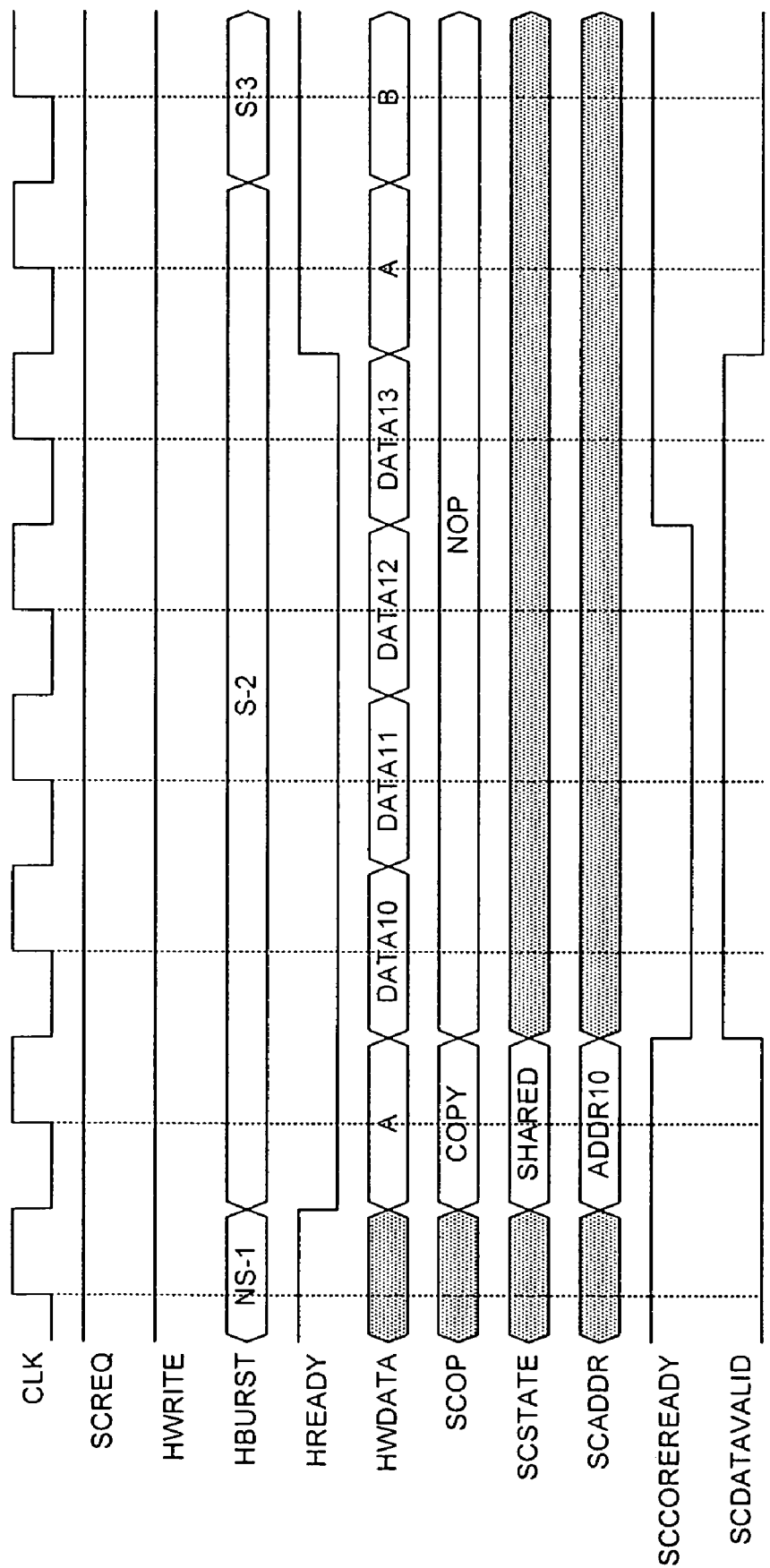

Coherent Write Burst Delayed By a Copy Command (See FIG. 11)

Although a particular embodiment of the invention has been described herein, it will be apparent that the invention is not limited thereto, and that many modifications and additions may be made within the scope of the invention. For example, various combinations of the features of the following dependent could be made with the features of the independent claims without departing from the scope of the present invention.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An integrated circuit comprising:

a plurality of processor cores operable to perform respective data processing operations, at least one of said processor cores for operating in both of (a) a coherent multi-processing mode having access to a coherent region within a memory shared with at least one other processor core and (b) a non-coherent mode in which coherency managing operations are never required to be performed in response to any memory access request that said at least one of said processor cores makes;

at least one write enabled control parameter storage element operable to store at least one mode control parameter related to said at least one configurable processor core, said mode control parameter controlling whether said at least one configurable processor core is currently operable in a coherent multi-processing mode or in a non-coherent processing mode;

a memory access control unit operable to control access to said memory by said plurality of processor cores, wherein said memory access control unit is operable to perform coherency management operations on at least some memory access requests received from said processor cores operating in a coherent multi-processing mode and to direct memory access requests received from said processor cores operating in a non-coherent processing mode to said memory without performing coherency management operations; and at least one data bus for passing said memory access requests from said at least one configurable processor core to said memory control unit, said at least one data bus comprising a main portion and a multi-processing portion, said at least one configurable processor core being operable to transmit said memory access requests via said main portion of said bus and said additional information via said multi-processing portion, said at least one configurable processor core being operable to de-activate said multi-processing portion of said bus in response to said mode control parameter indicating said at least one configurable processor core to be currently operable in said non-coherent processing mode.

2. An integrated circuit comprising:

a plurality of processor cores operable to perform respective data processing operations, at least one of said processor cores for operating in both of (a) a coherent multi-processing mode having access to a coherent region within a memory shared with at least one other processor core and (b) a non-coherent mode in which coherency managing operations are never required to be performed in response to any memory access request that said at least one of said processor cores makes;

at least one write enabled control parameter storage element operable to store at least one mode control parameter related to said at least one configurable processor core, said mode control parameter controlling whether said at least one configurable processor core is currently operable in a coherent multi-processing mode or in a non-coherent processing mode;

a memory access control unit operable to control access to said memory by said plurality of processor cores, wherein said memory access control unit is operable to perform coherency management operations on at least some memory access requests received from said processor cores operating in a coherent multi-processing mode and to direct memory access requests received from said processor cores operating in a non-coherent processing mode to said memory without performing coherency management operations; and at least one data bus for passing said memory access requests from said at least one configurable processor core to said memory control unit, said at least one data bus comprising a main portion and a multi-processing portion, said at least one configurable processor core being operable to transmit said memory access requests via said main portion of said bus and said additional information via said multi-processing portion, wherein said at least one configurable processor core is operable to deactivate said multi-processing portion of said bus when transmitting memory access requests that do not require coherency managing operations to be performed to ensure said shared memory region remains coherent.

3. An integrated circuit comprising:

a plurality of processor cores operable to perform respective data processing operations, at least one of said processor cores for operating in both of (a) a coherent multi-processing mode having access to a coherent region within a memory shared with at least one other processor core and (b) a non-coherent mode in which coherency managing operations are never required to be performed in response to any memory access request that said at least one of said processor cores makes;

at least one write enabled control parameter storage element operable to store at least one mode control parameter related to said at least one configurable processor core, said mode control parameter controlling whether said at least one configurable processor core is currently operable in a coherent multi-processing mode or in a non-coherent processing mode; and an input port in data communication with said control parameter storage element, such that said mode control parameter can be controlled by an external signal.

4. A method of processing data comprising:

performing data processing operations upon respective ones of a plurality of processor cores formed on an integrated circuit, at least one of said processor cores being configurable to operate either in a coherent multi-processing mode having access to a coherent region within a memory shared with at least one other processor core or in a non-coherent processing mode in which coherency managing operations are never required to be performed in response to any memory access request that said at least one of said configurable processor cores makes; and prior to performing said data processing operations, configuring said at least one configurable processor core by writing a mode control parameter related to said at least one configurable processor core, to a control parameter storage element within said integrated circuit, said mode control parameter controlling whether said at least one configurable processor core is currently operable in a coherent multi-processing mode or in a non-coherent processing mode, sending a memory access request from said at least one configurable processor to a memory access control unit;

receiving said memory access request at said memory access control unit and either:
  (i) performing a coherency management operation on said memory access request if said at least one configurable processor core is operating in a coherent multi-processing mode and said memory access request is a memory access request that requires coherency managing operations to be performed in order to ensure the shared memory region remains coherent; or
  (ii) directing said memory access request to said memory without performing coherency management operations, writing a coherent multi-processing mode, mode control parameter to said control parameter storage element;

sending a memory access request requiring coherency managing operations to be performed in order to ensure the shared memory region remains coherent from said at least one configurable processor core to said memory access control unit, said memory access request being augmented with additional information;

receiving said memory access request and said additional information at said memory access control unit; and performing said coherency management operation in response to receipt of said additional information, wherein said at least one configurable processor core sends said memory access request and additional data to said memory access control unit via a data bus, said data bus comprising a main portion and a multi-processing portion, said at least one configurable processor core sending said memory access requests via said main portion of said bus and said additional information via said multi-processing portion, wherein said at least one configurable processor core de-activates said multi-processing portion of said data bus prior to sending said memory access request.

5. A method of processing data comprising:

performing data processing operations upon respective ones of a plurality of processor cores formed on an integrated circuit, at least one of said processor cores being configurable to operate either in a coherent multi-processing mode having access to a coherent region within a memory shared with at least one other processor core or in a non-coherent processing mode in which coherency managing operations are never required to be performed in response to any memory access request that said at least one of said configurable processor cores makes; and prior to performing said data processing operations, configuring said at least one configurable processor core by writing a mode control parameter related to said at least one configurable processor core, to a control parameter storage element within said integrated circuit, said mode control parameter controlling whether said at least one configurable processor core is currently operable in a coherent multi-processing mode or in a non-coherent processing mode, wherein said step of writing said mode control parameter is performed by inputting a signal to an input port on said integrated circuit, said input port being in data communication with said control parameter storage element.

* * * * *